US010754806B2

(12) United States Patent
Evensen et al.

(10) Patent No.: US 10,754,806 B2
(45) Date of Patent: Aug. 25, 2020

(54) METHOD AND APPARATUS FOR ACCESS TO A COMPUTER UNIT

(75) Inventors: Cato Evensen, Straumsgrend (NO); Odd Helge Rosberg, Aksdal (NO)

(73) Assignee: Rosberg System AS, Haugesund (NO)

( * ) Notice: Subject to any disclaimer, the term of this patent is extended or adjusted under 35 U.S.C. 154(b) by 0 days.

(21) Appl. No.: 12/587,056

(22) Filed: Sep. 30, 2009

(65) Prior Publication Data

US 2010/0082827 A1    Apr. 1, 2010

(30) Foreign Application Priority Data

Sep. 30, 2008 (NO) .................................. 20084135

(51) Int. Cl.
*G06F 13/38* (2006.01)
*H01L 29/08* (2006.01)
*H04L 29/06* (2006.01)
*H04L 29/08* (2006.01)

(52) U.S. Cl.
CPC ............ *G06F 13/387* (2013.01); *H04L 67/12* (2013.01); *H04L 63/0428* (2013.01); *H04L 63/18* (2013.01)

(58) Field of Classification Search
None
See application file for complete search history.

(56) References Cited

U.S. PATENT DOCUMENTS

| | | | | |
|---|---|---|---|---|
| 5,153,918 A * | 10/1992 | Tuai | ........................ | G06F 21/32 713/182 |
| 6,247,055 B1 * | 6/2001 | Cotner et al. | ................. | 709/227 |
| 6,363,495 B1 * | 3/2002 | MacKenzie et al. | .......... | 714/4.5 |
| 6,408,063 B1 * | 6/2002 | Slotte et al. | .................. | 379/230 |
| 6,421,782 B1 | 7/2002 | Yanagisawa et al. | | |
| 6,526,131 B1 | 2/2003 | Zimmerman et al. | | |
| 6,931,429 B2 * | 8/2005 | Gouge et al. | ................. | 709/203 |

(Continued)

FOREIGN PATENT DOCUMENTS

| | | | | |
|---|---|---|---|---|
| GB | 2369904 | * 12/2002 | ............ | G06F 17/30 |
| JP | 2004-286037 A | 10/1992 | | |

(Continued)

OTHER PUBLICATIONS

IBM, "A Method and Apparatus for Sleep on LAN," Technical Disclosure, PriorArtDatabase, ip.com IPCOM00173706D, Aug. 21, 2008.

(Continued)

*Primary Examiner* — Scott B Christensen
(74) *Attorney, Agent, or Firm* — Abelman, Frayne & Schwab

(57) ABSTRACT

A computer unit (10) arranged to establish contact between itself and a centralized server (12), in where the computer unit comprises means to establish a networked connection (22) with said server (12), and wake up means in case the computer unit is in an off or sleeping state, and optionally if the computer unit is on. The computer unit (10) comprises or is connected to a mobile unit that is active whether the computer unit is in off, in hibernation or sleeping state, or on state, and in where the mobile unit is adapted to receive a unique request from the server (12), via a mobile telecommunication connection (20), and if the request is identified as genuine, the computer unit (10) is adapted to establish a new and separate networked connection (20; 22) to the server (12).

14 Claims, 2 Drawing Sheets

(56) References Cited

U.S. PATENT DOCUMENTS

| | | | |
|---|---|---|---|
| 7,058,719 B2* | 6/2006 | Motoyama | 709/228 |
| 7,103,344 B2* | 9/2006 | Menard | 455/343.2 |
| 7,139,822 B2* | 11/2006 | Guenther et al. | 709/224 |
| 7,185,229 B2 | 2/2007 | Cromer et al. | |
| 7,975,287 B2* | 7/2011 | Hung | 726/2 |
| 8,020,192 B2* | 9/2011 | Wright et al. | 726/1 |
| 8,072,994 B2* | 12/2011 | Moeller | 370/401 |
| 8,116,735 B2* | 2/2012 | Liu et al. | 455/411 |
| 8,169,899 B2* | 5/2012 | Gisby et al. | 370/230 |
| 2002/0087879 A1* | 7/2002 | Mantena et al. | 713/201 |
| 2002/0181676 A1* | 12/2002 | Noblot | H04L 63/10 379/93.02 |
| 2005/0076246 A1* | 4/2005 | Singhal | H04L 63/02 726/4 |
| 2005/0086460 A1 | 4/2005 | Huang | |
| 2005/0166213 A1 | 7/2005 | Cromer et al. | |
| 2005/0228980 A1 | 10/2005 | Brokish et al. | |
| 2005/0262247 A1* | 11/2005 | Whitehead | 709/227 |
| 2008/0005783 A1* | 1/2008 | Polzin et al. | 726/3 |
| 2008/0028053 A1 | 1/2008 | Kelley et al. | |
| 2008/0120423 A1* | 5/2008 | Hall et al. | 709/229 |
| 2009/0186596 A1* | 7/2009 | Kaltsukis | G08B 25/08 455/404.2 |
| 2010/0063889 A1* | 3/2010 | Proctor et al. | 705/21 |
| 2010/0091677 A1* | 4/2010 | Griff et al. | 370/252 |
| 2011/0267985 A1* | 11/2011 | Wilkinson et al. | 370/259 |

FOREIGN PATENT DOCUMENTS

| | | |
|---|---|---|
| JP | H04286037 A | 10/1992 |
| JP | 2011-089073 A | 3/1999 |
| JP | 2000-215167 A | 8/2000 |
| JP | 2001-202167 A | 7/2001 |
| JP | 2006-129019 | 5/2006 |
| JP | 2008-215637 A | 9/2008 |
| TW | I274249 | 2/2007 |
| TW | I306554 | 2/2009 |
| WO | 99/35805 A1 | 7/1999 |
| WO | 2006/025787 A1 | 3/2006 |

OTHER PUBLICATIONS

IBM, "Computer Remote Wake-Up via sms", IP.Com Journal, IP.Com Inc., Jun. 27, 2007 (cover page and pp. 1-2).

Extended European Search Report dated Aug. 13, 2013 by the European Patent Office in EP Application No. 13167738.7 (6 pages).

Japan Office Action for JP Appl'n No. 2016-075294, dated Apr. 18, 2017.

* cited by examiner

METHOD AND APPARATUS FOR ACCESS TO A COMPUTER UNIT

FIELD OF INVENTION

The present invention discloses a computer unit and method arranged to establish contact between itself and a centralized server, in where the computer unit comprises means to establish a networked connection with said server, and wake up means in case the computer unit is in an off state, hibernation or sleeping state, and optionally if the computer unit is on.

BACKGROUND OF THE INVENTION

US 20050166313 A1 describes a procedure to access a computer with Wakeup messages through the NIC (Network Interface Card), and describes how one through the network card can change data in BIOS, that again is stored in flash memory, and that BIOS gets new instructions so that an executable code is made.

US20080028053 A1 describes "Wake on LAN" (WoL) with control information that enables the boot of a computer through other equipment. It also describes how IT personnel may administer virus scans and do other maintenance tasks with a computer that is initially shut off, e.g. during the night hours. It also describes how the network card can be checked during normal boot to ensure that updated system information can be processed as a result of WOL-processing.

US20050086460 A1 describes WOL with BIOS and application in relation to three statuses: running mode, sleeping mode, abnormal off state, as well as to retrieve logs.

U.S. Pat. No. 6,421,782 B describes WOL established using a supplemental LAN-adapter in a docking station providing secure access.

"Technical disclosure" titled "A method and apparatus for Sleep on LAN", from IBM with IP.COM Nr IPCOM000173706D describes a function called Sleep on LAN, however it uses network cards to access different sleep functions listed with S1-S5 by addressing the computer with MAC address, IP address, Group tags or Magic Packet. Wake on LAN is mentioned, and PNP BIOS.

None of the above mentioned documents mentions use of a mobile service to "wake up" the computer, or by using mobile broadband where the mobile part provides the networked connection even if the computer is in an off state.

It is an object of this invention to provide a solution that gives secure user support for computer units regardless of their physical location, and where the computer unit itself establishes a secured connection to an external server or another computer unit.

SUMMARY OF THE INVENTION

The present invention provides a procedure to establish contact between a computer and a central server, where the computer incorporates equipment for Wake on LAN ((WoL), also known as Wake on WAN, Wake on MAN and other similar terms), and to establish a networked connection to the server.

The present invention provides a program and equipment that centrally services and gives a Personal Computer (PC) or other computer unit's support for different market segments (Private, SOHO (Small Office Home Office) to EMB (Enterprise Medium Business) and the Enterprise market). A large proportion of this market (up to the EMB segment) has little or no PC support, but is still increasingly dependent on its IT-infrastructure in its everyday business. The solution can be scaled up to the Enterprise market though, as there are user areas for this invention in a situation where the workforce becomes increasingly mobile.

This invention takes full control over the user/company's computers, in other words, the user uses his or her computer as usual, but all maintenance and backup is managed centrally without the active aid of the user and without any reduction in usability or performance. This system can provide services to all kinds of computers, such as desktops, workstations, laptops and servers, even computers and devices incorporated in cars, boats, ships, cranes, or other types of built-in computers/devices. The present invention is not to be confused with a traditional ASP (Application Service Provider) solution based on thin client technology. The invention can be used at most any location such as, for example, in the office, in a hotel, or at home. The computer will be 100% maintained even when being on vacation, travel or in the office. This enhances the usability, and a company can save money, time and resources by using this invention, and thereby make the user and/or the company more efficient.

As an example, if the user has a virus that prevents the computer or device from starting up or, in other ways, malfunction seriously (the user may contact the helpdesk or, in many cases, the computer can contact the servers itself to get help), the system is able to access the computer in question and service it all the way to the BIOS level (i.e., hardware level), if necessary (e.g., without the need for an operating system (e.g., Windows OS) being started), and then analyze the problem and perform the tasks needed to correct the problem and restore the usability of the computer. The control of the computer will then be handed back to the user.

The above mentioned object is achieved by a computer unit as defined in the independent claim 1, wherein the computer unit comprises or is connected to a mobile unit that is active whether the computer unit is in an off state, hibernation or sleeping state (or similar), or an on-state, and where the mobile unit is adapted to receive a unique request from the server, via a mobile telecommunication connection, and if the request is identified as genuine, the computer unit is adapted to establish a new and separate networked connection to the server.

Alternative embodiments of the computer unit are specified in respective dependent claims.

The mobile unit can be arranged to be connected via the mobile telecommunication connection as a service comprising GSM, TDMA, CDMA, PDC, PHS, 3G, HSDPA, WiMAX, Wifi or similar technologies.

Pre-programmed information about establishment of said network connection with the server can be stored in a secure way in the computer unit's hardware, such as e.g. a TPM chip. The computer unit can, upon receipt of the request, be arranged to break the connection and to set up a new connection to address or addresses programmed into said storage in the computer unit's hardware, in order to direct external communication to no other destinations than the stored ones.

Alternatively, the computer unit is arranged to reject the connection if the request is identified as genuine upon receipt of the request, and to set up a new connection to an address or addresses that are pre-programmed into said mobile unit, in order to direct external communication to no other destinations than the stored ones.

Further, the motherboard of the computer unit can be locked when the computer is in an off state, and/or that the main storage for user data (HDD/SSD or similar) can be similar locked, and/or that the user data can be encrypted.

The computer unit can be a PC, notebook, server or part of a server farm, or installed in any vehicle, ship, or other computerized equipment.

In an alternative embodiment, the computer unit can comprise equipment for Wake on LAN (WoL) and to establish said networked connection with the server, in where the mobile unit is active even if the computer unit is in an off state, as the mobile unit is adapted to receive a telephonic request from the server via the mobile telecommunication connection, such as 3G, Wifi or similar, and if the request is identified as genuine, the computer unit is arranged to establish a new and separate networked connection to the server.

Said object is also achieved by a method as defined in independent claim 9, comprising the following steps:

to send a mobile based request to the computer unit from the server, via a mobile telecommunication connection, containing a unique identifier, to receive the request by a mobile unit in the computer unit, whereupon the request is being identified, and the computer unit is establishing a new and separate network connection to the server, if the request is identified as authentic, otherwise the request is denied.

Alternative embodiments of the method are stated in respective independent method claims.

All requests are preferably being rejected, even though the request is identified as authentic.

Information regarding the networked connection with the server is stored in the hardware of the computer unit.

The initial request can for security reasons be rejected, whereupon the new connection is established, if the request is identified as genuine.

For the same reason, the unique identifier can be a caller-ID, or other unique identifiers on mobile networks, such as IMSI (International Mobile Subscriber Identity), MSIN (mobile station identification number) or other similar/future technologies.

The request can be a digital, analog or voice signal based upon wireless telecommunication.

BRIEF DESCRIPTION OF THE DRAWINGS

The invention shall now be described by the enclosed figures, in which.

DETAILED DESCRIPTION OF EMBODIMENTS

Figure 1:
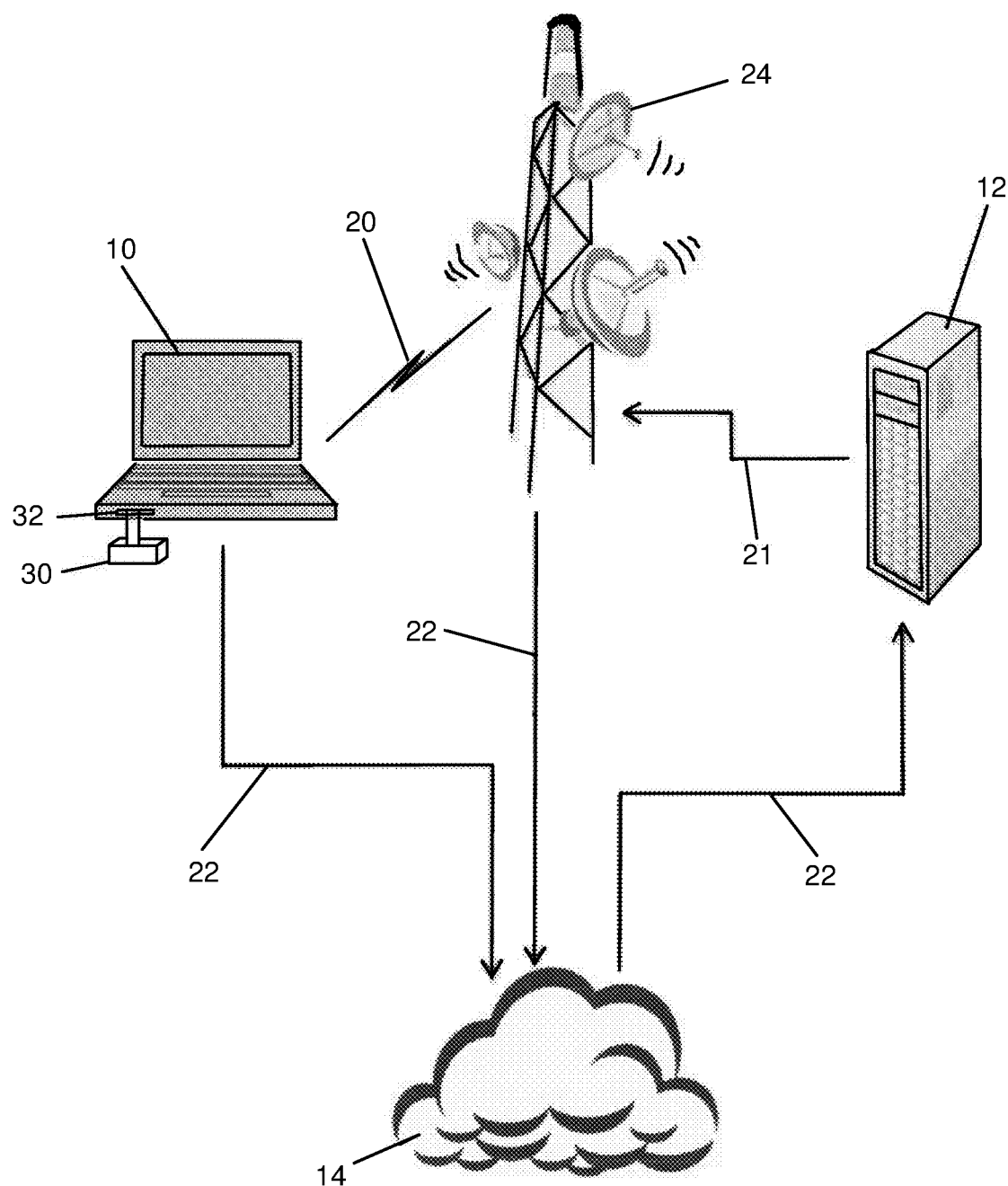
FIG. 1 is a block diagram of a system using the invention.
Figure 2:
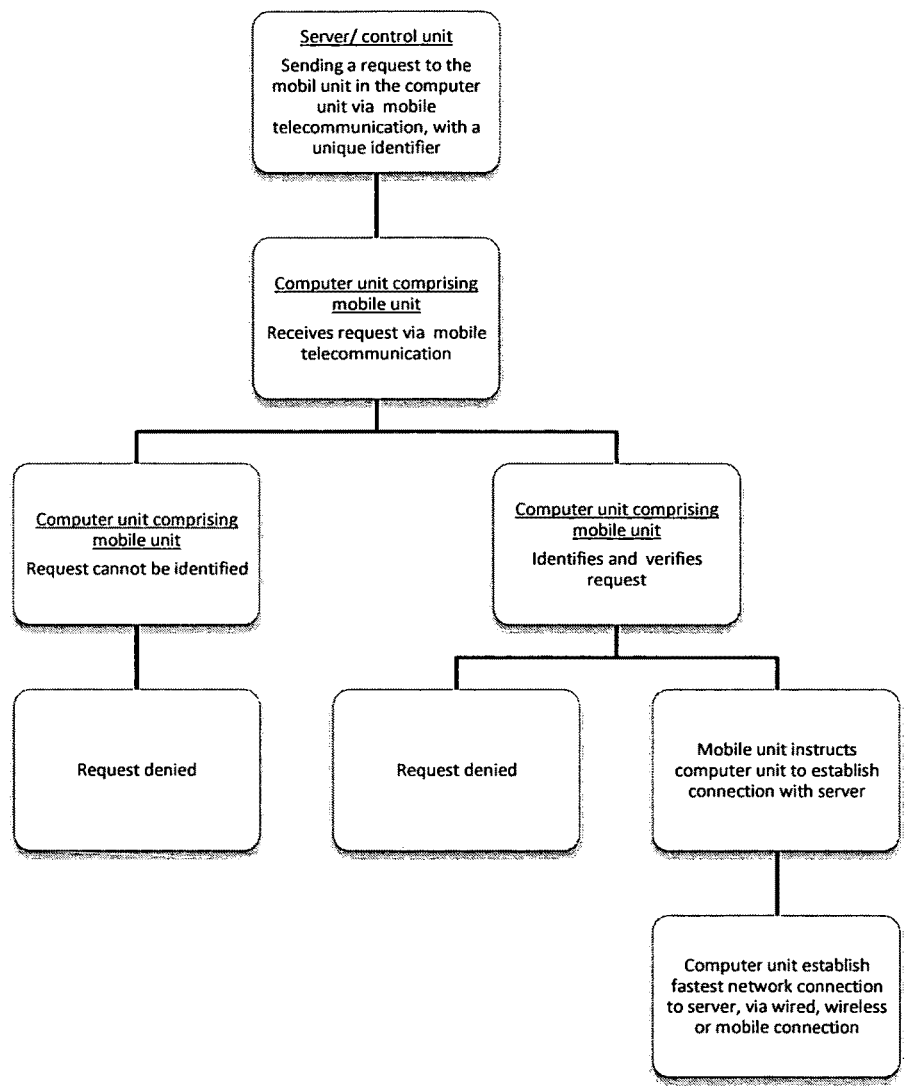
FIG. 2 is flow diagram of a method for operating the invention.

The figure shows a computer unit 10 that can be connected to the internet 14 through a networked connection 22, a server 12 that similarly can connect to the internet 14 through a networked connection 22, and a telecommunication carrier 24 that can communicate via a mobile telecommunication line 20 with the computer unit 10 and the server 12 via, for instance, a telecommunication line 21 or corresponding connection. Initial connection or call-up to the computer unit 10 is established using the telecommunication connection 20, while the establishing of a connection between the computer 10 and server 12 may run either through the networked connection 22 or line 20, depending on the coverage of cabled and mobile broadband connections.

A person of ordinary skill in the art for which the invention pertains will appreciate that the server 12 can be a server farm or other control unit, as desired. Further, it is understood that the server 12 can be another computer unit, such as a PC, notebook, etc., and is the unit which initiates the connection to the computer unit 10, but for ease of understanding the term "server" is used in the specification and in the patent claims. Telephonic request can further be a digital, analog or voice signal.

Enabling backup or support the computer 10 is dependent on being able to reach the computer regardless of location. To achieve this in the best way, the computer 10 is equipped with or connected to a mobile broadband unit 30 (3G/HSDPA or similar/future technologies) communicating through the telecommunication connection 20. This is adapted so that the mobile unit 30, which can be installed within or connected to the computer 10, is on even if the computer 10 itself is turned off (WoL), in hibernation or a sleep state (or similar), or turned on. Included in the solution are automated processes to prevent aging such as, for example, system optimizing programs, removal of excess files, defragmentation, and registry cleanup. This may vary depending on operating system, configuration and technical advances in the future. Furthermore, this enables the usage of hidden partitions on the storage unit to devise quick help in the case of serious problems. Examples may be a complete image of the system partition or a small image of the files that most frequently are corrupted or infected. Other tasks and processes may be added over time, and the aforementioned are only examples illustrating some of the purpose and effect of the invention.

The mobile unit 30 can be integrated with the computer unit 10, or the mobile unit 30 may be a separate unit which can be connected to the computer unit 10 by a communications medium 32 such as, for example, a USB connection, Infrared (IR) or Bluetooth.

The mobile telecommunication connection 24 can be a service comprising GSM, TOMA, COMA, PDC, PUS, 3G, HSDPA, WiMAX, Wifi or similar technologies.

Support will of course work as a point of contact between the customer and the service 24 no matter what the problem may be. The support center includes one or more servers 12 that are used during the servicing of the computer 10, and are independent of the user so as to be able to connect to the computer 10 and perform proactive support, such as virus scans, anti-ageing measures, backup or other tasks, or reactively help users with problems such as a computer that refuses to start.

Technical Description of Security:

1. Secured local computer—example of highest security level:

a. For purposes such as backup, system maintenance etc.; this operation may be initiated from the outside by the server 12 sending a request to the computer 10 by means of a unique identifier (such as for instance a phone number or any other technology offering a unique identifier over an open mobile network) through a mobile telecommunication service 24 to the computer 10 equipped with a mobile communications device 30 like GSM, TDMA, CDMA, PDC, PHS, 3G, HSDPA, WiMAX, Wifi or similar and future technologies. The request is received by the mobile receiver, i.e. the mobile unit 30 that is installed in or connected to the computer 10, where the request is identified (e.g. stored in the TPM chip), and if the identification is a match, the computer unit 10 rejects the call and sets up a new connection to the server 12 using the networks 14, 24 available to it. In this manner, it will be impossible to manipulate the communication and redirect the traffic.

b. All communications with the server farm etc. can be encrypted.

c. Mother board is locked when the computer is in an off state.

d. The storage device(s) (HDD, SSD etc.) are locked when the computer is in an off state.

e. The storage device(s) or user data areas are encrypted.

f. Login to the computer 10 is secured by using biometric devices (such as fingerprint, face recognition etc.)

g. The computer 10 may be marked with a special label (e.g. "extremely secured computer" or similar) as well as other visible and hidden markings to discourage theft as well as tracking devices either built in or separate.

h. The administration level will be locked to reduce risk.

i. Frequent backups of changes (even continuous) to minimize risk of data loss if the computer is lost or stolen, with logs and alarms if backup isn't performed as scheduled.

j. Functions for the removal of threats such as, for example, spyware, adware, virus and other threats varying over time, system maintenance and system rejuvenation may be run automatically and logged back into the system.

One or more of the functions a-j can be omitted in case a lower security level is desired. Alternatively, additional functions can be amended.

The uniqueness of the solution is mainly two things:

1. By using a mobile telecommunication technology (such as GSM, TDMA, CDMA, PDC, PHS, 3G, HSDPA, WiMAX, Wifi or similar and future technologies based on the same principle) with a unique identifier (such as a caller-ID, or other unique identifiers on mobile networks) no matter where the computer is located. The only, prerequisite is that there is an external communications connection (e.g., from the Internet 14 and/or telecommunications service provider 24) available where the computer 10 is located.

2. By contacting the device as described, this enables WoL to proceed if the computer device 10 is in an off state, hibernation state or sleeping state (or similar). This means that by using open mobile technologies, it can be initiated safely even if the computer 10 is behind a firewall/router or other screening devices that formerly made it impossible to localize and maintain computers with initiation from the server farm (e.g. because of NAT'ing or refusal of connections initiated from the outside).

By using these two features in combination, a user or other entity e.g., a company, can reach, maintain and/or do other tasks with their computers or devices regardless of their geographical location or what networks they are on. This may apply for hotels, at home, visiting other companies, etc.

In order to establish a secured connection through WoL, using mobile networks or similar technologies, there will be the following prerequisites (note that not all are mandatory):

When the computer 10 having or communicably coupled with the mobile device 30 is contacted through mobile/3G or similar services uniquely, the computer 10 will check the credentials in a safe storage area in hardware to find a match (for instance in safe storage in the TPM chip). If it is matched, the connection will be rejected. Other similar means of ensuring the safety may in time be applied here as technology evolves.

The computer 10 or device 30 understands that it needs to "call home" and searches again in its safe storage, as described above, to find out where to connect. There may be multiple addresses stored as alternatives if one is inaccessible. The computer or device will then, as needed, start the available communication devices and search for the quickest connection back to the server farm and set up the connection.

This connection will be set up using an encrypted method (e.g. VPN encrypted tunneling), thus ensuring that the communication is secure.

If the connection is started before any operating system is started, it is a prerequisite that the hardware supports such encrypted communications.

This means that the initiator will not have access to the computer 10 at any point unless the computer 10 itself calls back to a predefined address using an encrypted and adequately secured line.

The address(es) for this is stored securely in hardware (e.g. TPM chip or similar/future technologies) which is locked and encrypted, inaccessible from the outside or if needed even by the user.

In summary: Sending a request to a computer 10 or device 30 (e.g. the same way a number is presented on a mobile when someone calls). Checking the caller in safe storage (e.g. like the mobile phone searches the contact list to find a match), Rejecting the caller and setting up a secured connection to one or more locations (e.g. with alternative numbers as you have in your contact list) using available connections to predefined address(es) where the address cannot be manipulated by others or by the user.

Although an exemplary description of the invention has been set forth above to enable those of ordinary skill in the art to make and use the invention, that description should not be construed to limit the invention, and various modifications and variations can be made to the description without departing from the scope of the invention, as will be understood by those with ordinary skill in the art, and the scope thereof is determined by the claims that follow,

What is claimed is:

1. A computer device configured to establish a network connection between itself and a server, the computer device comprising:

a processor;

a memory configured for storing a plurality of pre-programmed network connection addresses, wherein at least one of the plurality of pre-programmed network connection addresses corresponds to the server, wherein the ore-programmed addresses cannot be manipulated; and a mobile receiver configured to receive a connection request containing a unique identifier via a mobile telecommunication connection, wherein the computer device is configured to:

break all connection requests received via the mobile telecommunication connection, each connection request comprising a corresponding unique identifier of a requesting device;

for a received given connection request, verify that a unique identifier of the given connection request from a corresponding requesting device is genuine by comparing the unique identifier to one or more identifiers stored in the memory and, upon verification that the unique identifier is genuine, the computer device is further configured to:

select, responsive to verifying that the unique identifier is genuine a quickest network connection address from amongst the plurality of pre-programmed network connection addresses stored in the memory, and establish a new network connection to the server using the selected pre-programmed network connection address, wherein the new network connection enables the corresponding requesting device to connect to the computer device via the server.

2. A computer device in accordance with claim 1, wherein the mobile receiver is configured to be connected via the mobile telecommunication connection that includes GSM, TDMA, CDMA, PDC, PHS, 3G, HSDPA, WiMAX or Wifi services.

3. A computer device in accordance with claim 1 having a motherboard which is locked when the computer device is in an off state.

4. A computer device in accordance with claim 1, wherein the computer device is a PC, notebook, part of a server, or installed in any vehicle, ship, or other computerized equipment.

5. A computer device in accordance with claim 1, wherein the computer device comprises equipment for Wake on LAN (WoL) and to establish said network connection with the server, wherein the mobile receiver is active even if the computer device is in an off state, the mobile receiver being configured to receive a telephonic request from the server via the mobile telecommunication connection and, if the request is identified as genuine, the computer device is configured to establish a new and separate network connection to the server.

6. A computer device in accordance with claim 1, wherein the connection request is initiated by the server.

7. A computer device in accordance with claim 1, wherein the unique identifier is a caller ID or other unique identifier of subscribers to a mobile network.

8. A computer device in accordance with claim 1, wherein the connection request is a digital, analog or voice signal transmitted over the mobile telecommunication connection.

9. A computer device in accordance with claim 1 further comprising equipment for Wake on LAN (WoL) and to establish a new and separate network connection with the server, wherein the mobile receiver is active even if the computer device is in an off state.

10. A computer device in accordance with claim 1 having a main storage device for user data that is locked when the computer device is in an off state.

11. A computer device in accordance with claim 1 having a main storage device for user data that is encrypted.

12. A non-transitory computer-readable storage media including software instructions defining at least one program that, when executed by a processor, programs a general-purpose computer comprising a mobile receiver to operate as a special purpose computer device comprising a processor and memory, the memory configured for storing a plurality of pre-programmed network connection addresses, wherein at least one of the plurality of pre-programmed network connection addresses corresponds to the server, wherein the pre-programmed addresses cannot be manipulated, the special purpose computer device being configured to perform a process comprising the steps of:
receiving, by the mobile receiver via a mobile telecommunication connection, a connection request containing a unique identifier;
breaking all connection requests received via the mobile receiver, each connection request comprising a corresponding unique identifier of a requesting device; and
for a received given connection request, verifying that a unique identifier of the given connection request from a corresponding requesting device is genuine by comparing the unique identifier to one or more identifiers stored in the memory and, upon verification that the unique identifier is genuine, the computer device being further configured for:
selecting, responsive to verifying that the unique identifier is genuine, a quickest network connection addresses stored in the memory of the computer device,
establishing a new network connection to the server using the selected pre-programmed network connection address wherein the new network connection enables the corresponding requesting device to connect to the computer device via the server.

13. A server configured to establish a network connection with a computer device which comprises a processor and memory, wherein at least one of the plurality of pre-programmed network connection addresses corresponds to the server, wherein the pre-programmed addresses cannot be manipulated, the computer device being configured to establish the networked connection with said server, wherein the computer device includes a mobile receiver, the server being configured to send a connection request containing a unique identifier via a mobile telecommunication connection to the mobile receiver, and wherein the computer device is configured to break all connection requests received via the mobile receiver, each connection request comprising a corresponding unique identifier of a requesting device; wherein for a received given connection request, the computer device is configured to verify that a unique identifier of the given connection request from a corresponding requesting device is genuine by comparing the unique identifier to one or more identifiers stored in memory of the computer device, and wherein the computer device is configured to select, responsive to verifying that the unique identifier is genuine, a quickest network connection address from amongst the plurality of pre-programmed network connection addresses stored in the memory of the computer device; and
the server being configured to receive a request to establish a new network connection from the computer device after the connection request containing the unique identifier has been identified as genuine, wherein the new network connection enables the corresponding requesting device to connect to the computer device via the server.

14. A method for establishing a network connection between a server and a computer device, the computer device comprising a mobile receiver, a processor and a memory, the memory configured for storing a plurality of pre-programmed network connection addresses, wherein at least one of the plurality of pre-programmed network connection addresses corresponds to the server, wherein the pre-programmed addresses cannot be manipulated, the method comprising:
sending a connection request containing a unique identifier via a mobile telecommunication connection from the server to the computer device, each connection request comprising a corresponding unique identifier of a requesting device;
breaking all connection requests received by the computer device-upon receipt of the connection request from the mobile telecommunication connection, each connection request comprising a corresponding unique identifier of a requesting device;
for a received given connection request, verifying that a unique identifier of the given connection request from a corresponding requesting device is genuine by comparing the unique identifier to one or more identifiers stored in the memory of the computer device and, upon verification that the unique identifier is genuine, the computer device is further configured for:

selecting, responsive to verifying that the unique identifier is genuine, a quickest network connection address from one of a plurality of pre-programmed network connection addresses stored in the memory, and establishing a new network connection to the server from the computer device using the selected pre-programmed network connection address, wherein the new network connection enables the corresponding requesting device to connect to the computer device via the server.

* * * * *